(12) United States Patent
Versteyhe

(10) Patent No.: US 9,597,959 B2
(45) Date of Patent: Mar. 21, 2017

(54) HYDROSTATIC AND DIRECT DRIVE TRANSMISSION

(71) Applicant: DANA BELGIUM N.V., Brugge (BE)

(72) Inventor: Mark R. J. Versteyhe, Oostkamp (BE)

(73) Assignee: Dana Belgium N.V., Bruggem (BE)

( * ) Notice: Subject to any disclaimer, the term of this patent is extended or adjusted under 35 U.S.C. 154(b) by 0 days.

(21) Appl. No.: 14/392,061

(22) PCT Filed: Feb. 11, 2014

(86) PCT No.: PCT/EP2014/052644
§ 371 (c)(1),
(2) Date: Jul. 23, 2015

(87) PCT Pub. No.: WO2014/122323
PCT Pub. Date: Aug. 14, 2014

(65) Prior Publication Data
US 2015/0354685 A1 Dec. 10, 2015

Related U.S. Application Data

(60) Provisional application No. 61/763,053, filed on Feb. 11, 2013.

(51) Int. Cl.
*B60K 17/344* (2006.01)
*F16H 47/02* (2006.01)

(52) U.S. Cl.
CPC ........... *B60K 17/344* (2013.01); *F16H 47/02* (2013.01); *B60Y 2200/415* (2013.01); *Y10T 74/19037* (2015.01)

(58) Field of Classification Search
CPC . B60K 17/344; F16H 47/02; Y10T 74/19037; B60Y 2200/415
(Continued)

(56) References Cited

U.S. PATENT DOCUMENTS 3,261,421 A 7/1966 Forster et al.
3,354,978 A 11/1967 Budzich
(Continued)

FOREIGN PATENT DOCUMENTS

DE 102006038093 A1 2/2008
EP 0826907 A2 3/1998
(Continued)

OTHER PUBLICATIONS

European Patent Office; International Search Report with Written Opinion; Apr. 4, 2014; EPO, Rijswijk, Netherlands; EPO, Munich Germany.

*Primary Examiner* — Kevin Hurley
*Assistant Examiner* — Michael Stabley
(74) *Attorney, Agent, or Firm* — Marshall & Melhorn, LLC

(57) ABSTRACT

A hydrostatic driveline has a power source, a transmission portion, a hydrostatic pump, a hydrostatic motor, a transfer case, a first axle assembly, an inter-axle drive shaft, and a second axle assembly. The transmission portion is drivingly engaged with the power source. The hydrostatic pump is in driving engagement with the transmission portion. The hydrostatic motor is in fluid communication with the hydrostatic pump. The transfer case is in driving engagement with the hydrostatic motor. The inter-axle drive shaft is in driving engagement with the transfer case and the transmission portion. The transmission portion, the hydrostatic pump, the hydrostatic motor, the transfer case, and the inter-axle shaft form a first power path for the hydrostatic driveline and the transmission portion and the inter-axle shaft form a second power path for the hydrostatic driveline.

9 Claims, 3 Drawing Sheets

(58) Field of Classification Search
USPC .......................................................... 180/242
See application file for complete search history.

(56) References Cited

U.S. PATENT DOCUMENTS

| | | | |
|---|---|---|---|
| 3,680,652 A | 8/1972 | Greene | |
| 5,353,889 A | 10/1994 | Hamada | |
| 5,946,983 A | 9/1999 | Brambilla | |
| 6,196,348 B1 | 3/2001 | Yano et al. | |
| 6,213,241 B1 | 4/2001 | Kita et al. | |
| 6,401,854 B2 | 6/2002 | Yano et al. | |
| 7,273,122 B2* | 9/2007 | Rose | B60K 6/12 180/165 |
| 7,441,623 B2 | 10/2008 | Casey et al. | |
| 7,793,496 B2* | 9/2010 | Rampen | B60K 6/12 60/414 |
| 7,841,432 B2* | 11/2010 | Lynn | B60K 6/12 180/301 |
| 7,856,816 B2* | 12/2010 | Duray | B60K 6/12 180/165 |
| 8,051,916 B2* | 11/2011 | Bright | B62D 53/02 172/3 |
| 8,061,466 B2* | 11/2011 | Carlton | E02F 3/6481 172/125 |
| 8,132,868 B2* | 3/2012 | Walker | B60K 6/12 180/165 |
| 8,459,394 B2* | 6/2013 | Storer | E02F 3/6481 172/75 |
| 8,667,865 B2 | 3/2014 | Hoyle et al. | |
| 2008/0264189 A1* | 10/2008 | Hancock | B60K 25/00 74/15.82 |
| 2010/0023227 A1* | 1/2010 | Storer | E02F 3/6481 701/48 |
| 2011/0030505 A1* | 2/2011 | Hoyle | B60K 17/35 74/665 A |

FOREIGN PATENT DOCUMENTS

| | | |
|---|---|---|
| EP | 2264334 A1 | 12/2010 |
| EP | 2426376 A2 | 3/2012 |

* cited by examiner

HYDROSTATIC AND DIRECT DRIVE TRANSMISSION

CLAIM OF PRIORITY

The present application claims the benefit of priority to U.S. Provisional Application No. 61/763,053 filed on Feb. 11, 2013, which is incorporated herein in its entirety by reference.

FIELD OF THE INVENTION

The present invention relates to hydrostatic drivelines and more specifically to a hydrostatic drivelines having a direct drive capability.

BACKGROUND OF THE INVENTION

Hydrostatic transmissions use a hydraulic fluid to transmit power from a power source (for example, an internal combustion engine) to a power output (for example, a final drive or a plurality of wheels). Hydrostatic transmissions are typically used in agricultural tractors and other off-highway equipment, for example, forklifts, excavators, earth moving machines, and other vehicles.

The major benefits of hydrostatic transmissions are a large range of continuously variable speed, a precise control of traction effort and speed, and high maneuverability. Each of these benefits is directly related to vehicle productivity. Other advantages include high power capability in a compact size, a fast response related to low inertia, maintaining a controlled speed regardless of load, high traction force at a low engine speed, flexibility in packaging, dynamic braking, and simplicity in reversing vehicle direction. Compared to traditional solutions, such as a hydrodynamic transmission with a torque converter, hydrostatic transmissions can provide improved performance. As a non-limiting example, a wheel loader application may require high maneuverability and a wide torque and speed conversion range.

Hydrostatic transmissions are not without their drawbacks, however. Hydrostatic transmissions tend to have a lower overall efficiency, increased maintenance costs, and increased initial investment cost compared to conventional gear transmissions. As a result, design considerations for a given application in a hydrostatic transmission are very important. As a non-limiting example, a hydrostatic transmission design can focus on one or more particular operating modes, such as low speed driving to provide maximum tractive effort, variable speed operation, or maximum speed operation. Focusing a design on an operating mode, will increase an overall efficiency of the transmission and proper sizing of transmission components will result in a more cost-effective solution.

A hydrostatic driveline can be divided into many standard categories based on the characteristics of the hydraulic pump and the hydraulic motor. The hydrostatic driveline can include a fixed displacement pump or a variable displacement pump and a fixed displacement motor or a variable displacement motor. A common combination amongst hydrostatic drivelines is a driveline configures with a variable displacement pump and a fixed displacement motor. In this combination, an output speed is controlled by varying a displacement of the pump.

To increase versatility of a hydrostatic driveline, such as including a high output capacity and a wide velocity of operational ranges, many alternative concepts of hydrostatic drivelines have been developed to meet such demands. One of the simplest and most common solutions is to use the hydrostatic transmission with a mechanical gearbox connected in series, and is shown in FIG. 1. A hydrostatic driveline 100 for a vehicle 102 includes a power source 104 in driving engagement with a hydrostatic pump 106 through the use of a transmission 108. An auxiliary pump 110 may also be in driving engagement with the power source 104 through the transmission 108. The hydrostatic pump 106 is in fluid communication with a hydrostatic motor 112. The hydrostatic motor 112 is in driving engagement with a transfer case 114, which is in driving engagement with a first drive shaft 116 and a second drive shaft 118. The first drive shaft 116 is in driving engagement with a first axle 120 and the second drive shaft 116 is in driving engagement with a second axle 122.

It would be advantageous to develop a hydrostatic driveline that includes a direct drive capability, which offers the benefits of increased efficiency at a high speed operating mode while maintaining the benefits of a hydrostatic drive at a low speed operating mode.

SUMMARY OF THE INVENTION

Presently provided by the invention, a hydrostatic driveline that includes a direct drive capability, which offers the benefits of increased efficiency at a high speed operating mode while maintaining the benefits of a hydrostatic drive at a low speed operating mode, has surprisingly been discovered.

In one embodiment, the present invention is directed to a hydrostatic driveline. The hydrostatic driveline comprises a power source, a transmission, a hydrostatic pump, a hydrostatic motor, a transfer case, a first axle assembly, an inter-axle drive shaft, and a second axle assembly. The transmission portion is drivingly engaged with the power source. The hydrostatic pump is in driving engagement with the transmission portion. The hydrostatic motor is in fluid communication with the hydrostatic pump. The transfer case is in driving engagement with the hydrostatic motor. The first axle assembly is in driving engagement with the transfer case. The inter-axle drive shaft is in driving engagement with the transfer case and the transmission portion. The second axle assembly is in driving engagement with the inter-axle drive shaft. The transmission portion, the hydrostatic pump, the hydrostatic motor, the transfer case, and the inter-axle shaft form a first power path for the hydrostatic driveline and the transmission portion and the inter-axle shaft form a second power path for the hydrostatic driveline.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
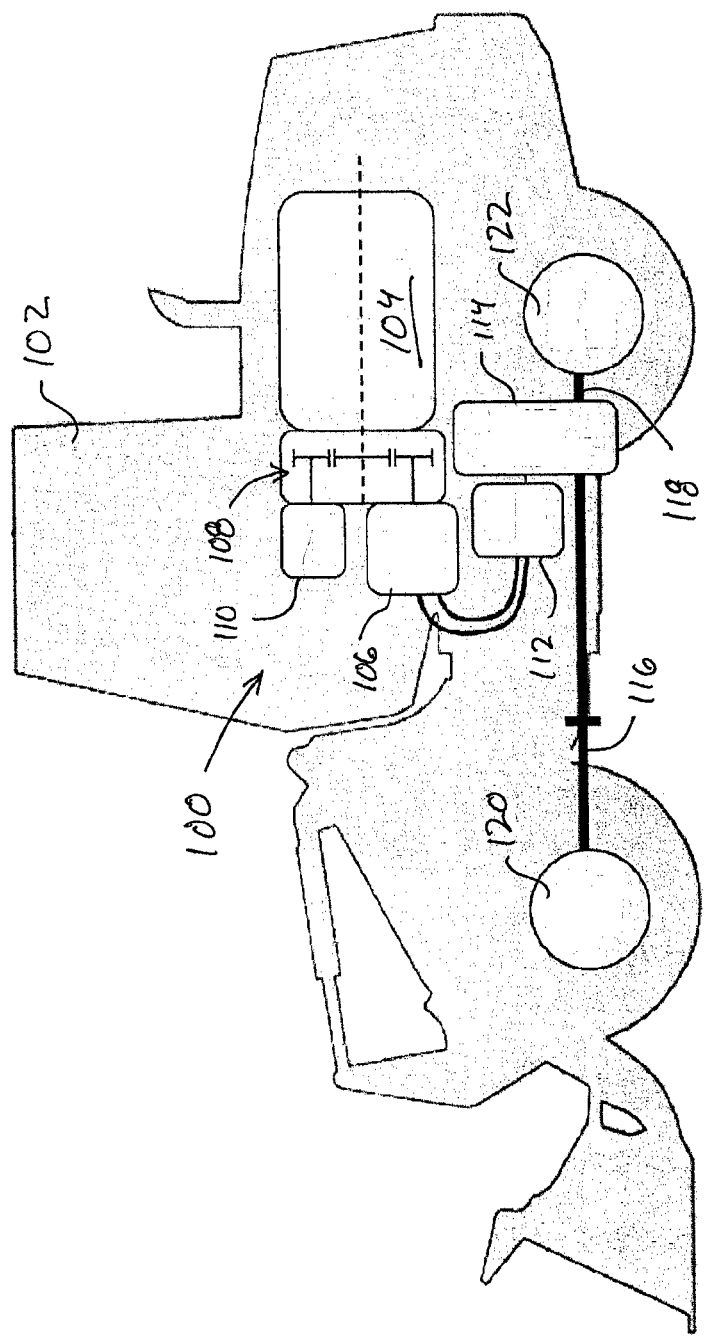
FIG. 1 is a schematic illustration of a hydrostatic driveline known in the prior art, the hydrostatic driveline shown within a vehicle.
Figure 2:
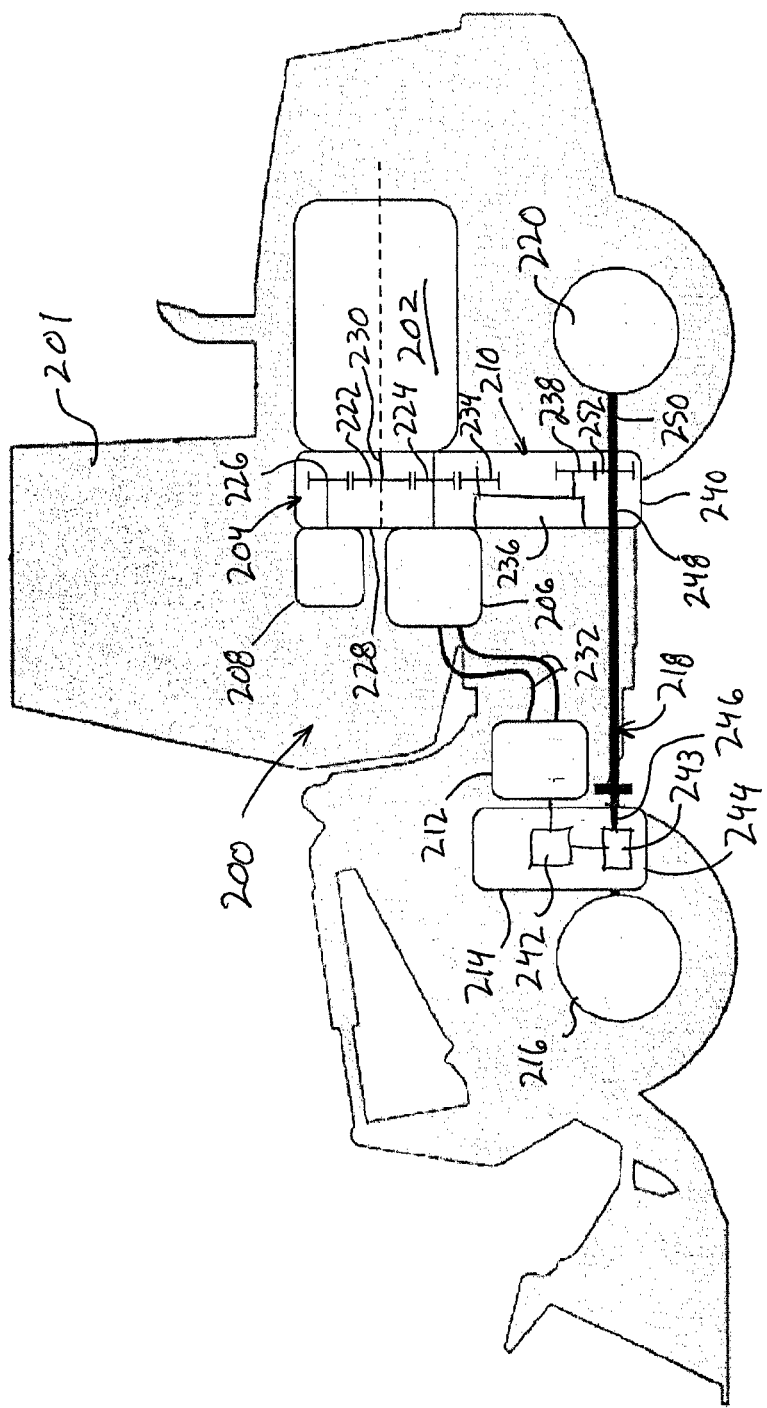
FIG. 2 is a schematic illustration of a hydrostatic driveline according to an embodiment of the present invention, the hydrostatic driveline shown within a vehicle.
Figure 3:
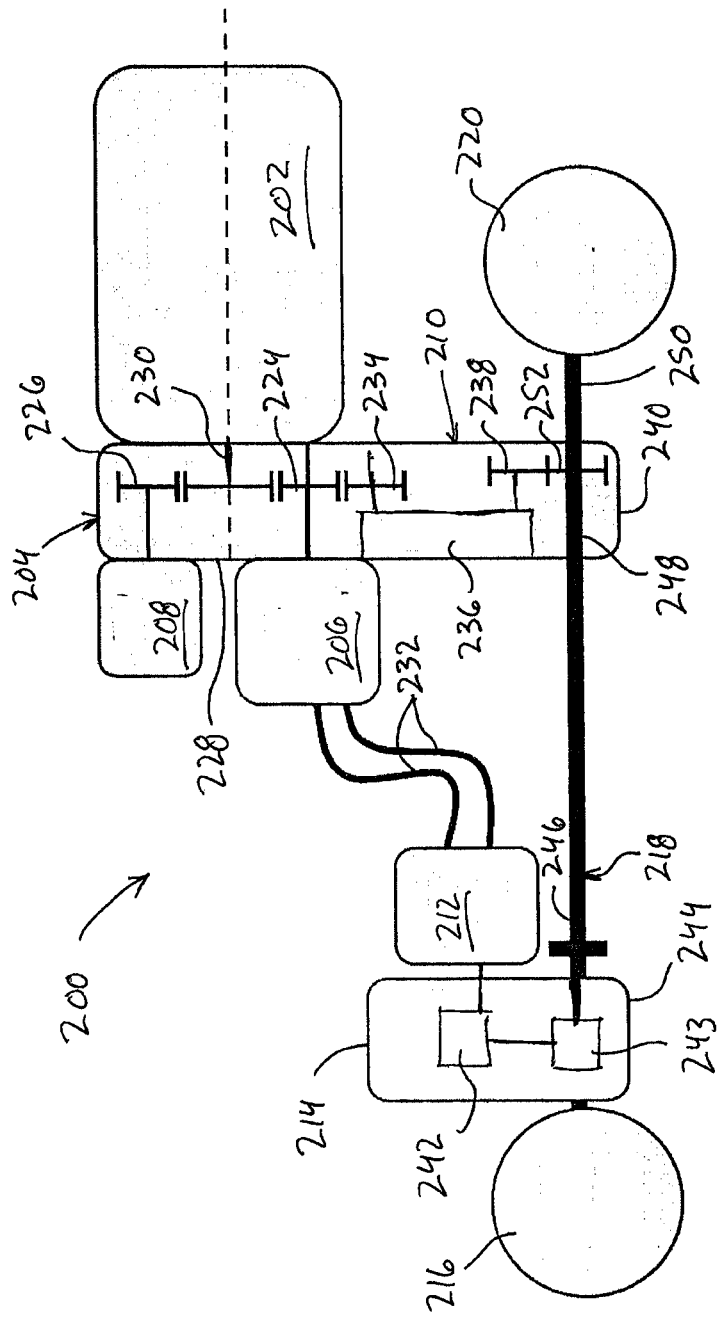
FIG. 3 is a schematic illustration of the hydrostatic driveline shown in FIG. 2.

FIG. 2 illustrates a hydrostatic driveline 200 disposed within a vehicle 201. The hydrostatic driveline 200 includes a power source 202 in driving engagement with a primary transmission portion 204. A hydrostatic pump 206, an auxiliary pump 208, and a secondary transmission portion 210 are drivingly engaged with the primary transmission portion 204. The hydrostatic pump 206 is in fluid communication with a hydrostatic motor 212. The hydrostatic motor 212 is in driving engagement with a transfer case 214, which is in driving engagement with a first axle 216 and an inter-axle drive shaft 218. The inter axle drive shaft 218 is also in driving engagement with the secondary transmission portion 210 and a second axle 220. The hydrostatic driveline 200 may be operated in a hydrostatic mode or a direct drive mode. FIG. 3 also illustrates the hydrostatic driveline 200.

The power source 202 applies power to the primary transmission portion 204 of the hydrostatic driveline 200. The power source 202 is, for example, an internal combustion engine; however, it is understood that the power source 202 may include an electric motor or another source of rotational output. It is understood that the power source 202 may be a hybrid power source including both an internal combustion engine and an electric motor. Further, it is understood that the power source 202 may include an output ratio adjusting device as known in the art.

The primary transmission portion 204 facilitates a transfer of power from the power source 202 to the hydrostatic pump 206, the auxiliary pump 208, and the secondary transmission portion 210. The primary transmission portion 204 comprises at least a main gear 222, a primary take off gear 224, and a secondary take off gear 226 rotatably disposed in a housing 228; however, it is understood that the primary transmission portion 203 may comprise a different number of gear and that the primary transmission portion 203 may be configured to distribute power to the gears 224, 226 in any manner. The primary transmission portion 204 is typically coupled directly to the power source 202; however, the primary transmission portion 204 may also be coupled to another portion of the vehicle 201. Further, it is understood that the primary transmission portion 204 may include a clutch (not shown) as known in the art, for one of reducing and interrupting a rotational force transferred from the power source 202 to the primary transmission portion 204.

The main gear 222 is a helical spur gear fitted to an output 230 of the power source 202; however, it is understood that the main gear 222 may be another type of gear. The main gear 222 is rotatably supported within the housing 228 with a plurality of bearings (not shown). The main gear 22 is in driving engagement with the primary take off gear 224 and the secondary take off gear 226.

The primary take off gear 224 is a helical spur gear in driving engagement with the hydrostatic pump 206; however, it is understood that the primary take off gear 224 may be another type of gear. The primary take off gear 224 is rotatably supported within the housing 228 with a plurality of bearings (not shown). As mentioned hereinabove, the primary take off gear 224 is in driving engagement with the main gear 222 and the secondary transmission portion 210.

The secondary take off gear 226 is a helical spur gear in driving engagement with the auxiliary pump 206; however, it is understood that the secondary take off gear 226 may be another type of gear. The secondary take off gear 226 is rotatably supported within the housing 228 with a plurality of bearings (not shown). As mentioned hereinabove, the secondary take off gear 226 is in driving engagement with the main gear 222.

The hydrostatic pump 206 is a hydraulic axial piston pump having a movable swashplate (not shown) which varies a displacement thereof. However, it is understood the hydrostatic pump 206 may be any other type of variable displacement pump. As mentioned hereinabove, the hydrostatic pump 206 is drivingly engaged with the power source 202 through the primary transmission portion 204. The hydrostatic pump 206 is in fluid communication with the hydrostatic motor 2012 through at least two fluid conduits 232. As the hydrostatic pump 206 is drivingly engaged with the power source 202 through the primary take off gear 224, a drive portion of the hydrostatic pump 206 always rotates in the same direction as the power source 2002. A direction of flow through the hydrostatic pump 206 is changed by adjusting a swashplate angle of the hydrostatic pump 206. By adjusting the swashplate angle of the hydrostatic pump 206, a forward and a reverse direction is provided when the hydrostatic driveline 200 is operated in the hydrostatic mode.

The auxiliary pump 208 is a fixed displacement hydraulic pump. However, it is understood the auxiliary pump 208 may be another type of hydraulic pump, such as a variable displacement hydraulic pump. The auxiliary pump 208 is drivingly engaged with the power source 202 through the secondary take off gear 226. The auxiliary pump 208 is in fluid communication with an auxiliary device (not shown) of the vehicle 201.

The secondary transmission portion 210 facilitates a transfer of power from the power source 202 to the inter-axle drive shaft 218 when the hydrostatic driveline 200 is placed in the direct drive mode. The primary transmission portion 204 comprises at least an input gear 234, a gear selection portion 236, and an output gear 238 rotatably disposed in a housing 240; however, it is understood that the secondary transmission portion 210 may comprise another arrangement that facilitates drive ratio selection. The secondary transmission portion 210 is typically coupled directly to the primary transmission portion 204; however, the secondary transmission portion 210 may also be coupled to another portion of the vehicle 201 or the primary transmission portion 204 and the secondary transmission portion 210 may be unitary. The primary transmission portion 204 and the secondary transmission portion 210 combined may be referred to as a long drop transmission.

The input gear 234 is a helical spur gear in driving engagement with the primary take off gear 224 and the gear selection portion 236; however, it is understood that the input gear 234 may be another type of gear or that the input gear 234 may be in driving engagement with the main gear 222. The input gear 234 is rotatably supported within the housing 240 with a plurality of bearings (not shown).

The gear selection portion 236 comprises a plurality of clutches (not shown) and a plurality of drive ratios (not shown). As a non-limiting example, the gear selection portion 236 may include three clutches and three drive ratios; however, it is understood that the gear selection portion 236 may comprise another number of clutches and drive ratios. As a further non-limiting example, the gear selection portion 236 includes two forward drive ratios and one reverse drive ratio; however, it understood that the gear selection portion 236 may have another drive ratio arrangement. As mentioned hereinabove, the gear selection portion 236 is in driving engagement with the input gear 234. Further, the gear selection portion 236 is in driving engagement with the output gear 238.

The output gear 238 is a helical spur gear in driving engagement with the gear selection portion 236 and the inter-axle drive shaft 218; however, it is understood that the output gear 238 may be another type of gear. The output gear 238 is rotatably supported within the housing 240 with a plurality of bearings (not shown).

The hydrostatic motor 212 is a fixed displacement hydraulic motor. However, it is understood the hydrostatic motor 212 may be another type of hydraulic motor, such as a variable displacement hydraulic motor. The hydrostatic motor 212 is drivingly engaged with the transfer case 214. The hydrostatic motor 212 is in fluid communication with the hydrostatic pump 206 through the fluid conduits 232.

The transfer case 214 facilitates driving engagement between the hydrostatic motor 212, the first axle 216, and the inter-axle drive shaft 218 when the hydrostatic driveline 200 is placed in the hydrostatic drive mode. The transfer case 214 comprises at least one drive ratio 242 and a transfer case clutch 243 rotatably disposed in a housing 244; however, it is understood that the transfer case 214 may comprise another arrangement that facilitates driving engagement between the hydrostatic motor 212, the first axle 216, and the inter-axle drive shaft 218. When the transfer case clutch 243 is placed in a disengaged position, the transfer case 214 is drivingly disengaged from the inter-axle drive shaft 218. The transfer case 214 is coupled to a portion of the vehicle 201 adjacent the first axle 216.

The first axle 216 is an axle assembly in driving engagement with the transfer case 214. The first axle 216 facilitates driving engagement between the transfer case 214 and an operating surface (not shown) the vehicle 201 is operated on. Typically, the first axle 216 comprises at least a differential (not shown), at least two axle portions (not shown), a pair of hubs (not shown), and a pair of wheels (not shown). Further, the first axle 216 may comprise a plurality of joints and at least a portion of a vehicle suspension system. The first axle 216 may be referred to as a front axle of the vehicle 201.

The inter-axle drive shaft 218 is a shaft assembly in driving engagement with the transfer case 214, the output gear 238 of the secondary transmission portion 210, and the second axle 220. The inter-axle drive shaft 218 may comprise a plurality of elongate members connected with at least one joint or the inter-axle drive shaft 218 may comprise a single elongate member. The inter-axle drive shaft 218 comprises a first end portion 246, an intermediate portion 248, and a second end portion 250. The first end portion 246 is drivingly engaged with the transfer case 214. The first end portion 246 may be drivingly engaged with the transfer case 214 through a plurality of splines; however, it is understood that that first end portion 246 may be drivingly engaged with the transfer case 214 in another manner. The intermediate portion 248 includes a geared portion 252 radially extending therefrom which is drivingly engaged with the output gear 238 of the secondary transmission portion 210; however, it is understood that the intermediate portion 248 may be drivingly engaged with the output gear 238 of the secondary transmission portion 210 in another manner. The second end portion 250 is drivingly engaged with the second axle 220. The second end portion 250 may be drivingly engaged with the second axle 220 through a plurality of splines; however, it is understood that that second end portion 250 may be drivingly engaged with the second axle 220 in another manner.

The second axle 220 is an axle assembly in driving engagement with second end portion 250 of the inter-axle drive shaft 218. The second axle 220 facilitates driving engagement between the second end portion 250 of the inter-axle drive shaft 218 and the operating surface the vehicle 201 is operated on. Typically, the second axle 220 comprises at least a differential (not shown), at least two axle portions (not shown), a pair of hubs (not shown), and a pair of wheels (not shown). Further, the second axle 220 may comprise a plurality of joints and at least a portion of a vehicle suspension system. The second axle 220 may be referred to as a rear axle of the vehicle 201.

In use, the hydrostatic driveline 200 may be operated in the hydrostatic mode or the direct drive mode.

In the hydrostatic mode, the hydrostatic driveline 200 is operated at lower speeds using the hydrostatic pump 206 and the hydrostatic motor 212. As mentioned hereinabove, by adjusting the swashplate angle of the hydrostatic pump 206, the forward and the reverse direction is provided to the transfer case 214, which is in driving engagement with the first axle 216 and the second axle 220 through the transfer case clutch 243 and the inter-axle drive shaft 218. In the hydrostatic mode, the gear selection portion 236 is drivingly disengaged from the output gear 238 of the secondary transmission portion 210.

In the direct drive mode, the hydrostatic driveline 200 is operated at higher speeds through the secondary transmission portion 210, the inter-axle drive shaft 218, and the second axle 220. By disengaging the transfer case clutch 243 and engaging the gear selection portion 236 with the output gear 238 of the secondary transmission portion 210, the power source 202 is drivingly engaged with the second axle 220.

One advantage of the hydrostatic driveline 200 is arranging the primary transmission portion 204 and the secondary transmission portion 210 so that a mechanical connection is afforded in a substantially vertical manner from the power source 202 to the inter-axle drive shaft 218. The hydrostatic driveline 200 occupies an equal or lesser amount of space in the vehicle 201 than a conventional hydrodynamic transmission, which is a significant improvement over conventional hydrostatic drivelines. When the hydrostatic driveline 200 is operated in the direct drive mode, an overall efficiency of the hydrostatic driveline 200 is much be much higher compared to the hydrostatic mode, as the secondary transmission portion 210 is configured for low torque, high speed applications. As a result, the load requirements of the secondary transmission portion 210 are decreased, and accordingly the costs of the secondary transmission portion 210 are also decreased. Additionally, the direct drive mode of operation for the hydrostatic driveline 200 may also allow a manufacturer to eliminate a need for more than one hydrostatic motors or to simplify the secondary transmission 210 to a two speed arrangement, further reduce a cost of the hydrostatic driveline 200.

The hydrostatic driveline 200 offers many advantages over simple hydrostatic transmissions and hydrodynamic transmissions. The hydrostatic driveline 200 offers improved performance in the form of high tractive effort for launching a vehicle incorporating the driveline 200. Further, a maximum traction force at low speeds remains regardless of an amount of power used auxiliary devices. The hydrostatic driveline 200 provides continuously variable capabilities at low speeds, provides high maneuverability, precise speed control, and speed variability (for example, a torque-speed conversion range) to the vehicle. The hydrostatic driveline 200 also simplifies reversing a direction of the vehicle by reversing a flow of the hydrostatic pump 206. The hydrostatic driveline 200 offers robustness and high efficiency at high speeds thanks to the direct drive mode. The hydrostatic driveline 200 offers reduced fuel consumption through the selection of optimal operating modes, which is further supported by improved productivity due to increased performance and maneuverability of the vehicle. Lastly, the hydrostatic driveline 200 provides the benefit of packaging flexibility as a result of placing the hydrostatic motor 212 adjacent the first axle 216, where increased flexibility is offered for component location.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A hydrostatic driveline, comprising:
   a power source;
   a transmission portion comprising a primary transmission portion and a secondary transmission portion drivingly engaged with the power source;
   a hydrostatic pump in direct driving engagement with the transmission portion;
   a hydrostatic motor in fluid communication with the hydrostatic pump;
   a transfer case in direct driving engagement with the hydrostatic motor;
   a first axle assembly in driving engagement with the transfer case;
   an inter-axle drive shaft in direct driving engagement with the transfer case and the transmission portion; and
   a second axle assembly in driving engagement with the inter-axle drive shaft, wherein the transmission portion, the hydrostatic pump, the hydrostatic motor, the transfer case, and the inter-axle shaft form a first power path for the hydrostatic driveline and the transmission portion and the inter-axle shaft form a second power path for the hydrostatic driveline and wherein the primary transmission portion is in driving engagement with the hydrostatic pump and the secondary transmission portion is in driving engagement with the inter-axle drive shaft.

2. The hydrostatic driveline according to claim 1, wherein the secondary transmission portion includes at least three clutches and three drive ratios.

3. The hydrostatic driveline according to claim 1, wherein the transfer case includes a transfer case clutch for drivingly disengaging the transfer case from the inter-axle drive shaft.

4. The hydrostatic driveline according to claim 1, wherein the inter-axle drive shaft comprises a first end portion drivingly engaged with the transfer case, an intermediate portion drivingly engaged with the transmission portion, and a second end portion drivingly engaged with the second axle assembly.

5. The hydrostatic driveline according to claim 4, wherein the intermediate portion of the inter-axle drive shaft includes a geared portion radially extending therefrom.

6. The hydrostatic driveline according to claim 1, wherein the hydrostatic pump is a variable displacement hydrostatic pump and the hydrostatic motor is a fixed displacement hydrostatic motor.

7. The hydrostatic driveline according to claim 1, wherein the primary transmission portion includes a primary take off gear in driving engagement with the power source, the hydrostatic motor, and the secondary transmission portion.

8. The hydrostatic driveline according to claim 1, wherein the primary transmission and the secondary transmission portion are arranged in a substantially vertical manner.

9. The hydrostatic driveline according to claim 1, further comprising an auxiliary pump in drivingly engagement with the power source.

* * * * *